(12) United States Patent
Kim

(10) Patent No.: US 8,215,253 B2
(45) Date of Patent: Jul. 10, 2012

(54) FLOATING STRUCTURE MOTION SUPPRESSION SYSTEMS AND METHODS

(75) Inventor: Wanjun Kim, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/442,027

(22) PCT Filed: Sep. 19, 2007

(86) PCT No.: PCT/US2007/078888
§ 371 (c)(1),
(2), (4) Date: Apr. 24, 2009

(87) PCT Pub. No.: WO2008/036737
PCT Pub. Date: Mar. 27, 2008

(65) Prior Publication Data
US 2010/0037808 A1    Feb. 18, 2010

Related U.S. Application Data

(60) Provisional application No. 60/826,410, filed on Sep. 21, 2006.

(51) Int. Cl.
*B63B 39/00*    (2006.01)

(52) U.S. Cl. .................................. 114/122; 114/264
(58) Field of Classification Search .................. 114/122, 114/264, 265, 266, 125; 405/195.1
See application file for complete search history.

(56) References Cited

U.S. PATENT DOCUMENTS

| | | | | | |
|---|---|---|---|---|---|
| 2,678,017 | A | * | 5/1954 | Collins | 114/265 |
| 2,889,795 | A | * | 6/1959 | Parks | 114/122 |
| 3,537,412 | A | * | 11/1970 | Henderson | 114/122 |
| 3,568,620 | A | * | 3/1971 | Douglas | 114/125 |
| 4,167,147 | A | * | 9/1979 | Bergman | 114/122 |
| 4,231,313 | A | * | 11/1980 | Heerema et al. | 114/265 |
| 4,582,014 | A | * | 4/1986 | Patel | 114/125 |
| 4,864,958 | A | * | 9/1989 | Belinsky | 114/265 |
| 5,653,188 | A | * | 8/1997 | Molin | 114/266 |
| 6,021,728 | A | * | 2/2000 | Delrieu | 114/265 |
| 6,213,045 | B1 | | 4/2001 | Gaber | 114/266 |
| 6,761,124 | B1 | | 7/2004 | Srinivasan | 114/264 |
| 6,910,438 | B2 | | 6/2005 | Leverette et al. | 114/265 |

\* cited by examiner

*Primary Examiner* — Lars A Olson

(57) ABSTRACT

A system comprising a floating structure, the structure subject to waves and/or water currents; and at least one motion suppression system attached to the floating structure; the motion suppression system comprising a first oscillating water column tuned to a first frequency and a second oscillating water column tuned to a second frequency.

9 Claims, 7 Drawing Sheets

FLOATING STRUCTURE MOTION SUPPRESSION SYSTEMS AND METHODS

PRIORITY CLAIM

The present application claims priority of U.S. Provisional Application No. 60/826,410 filed 21 Sep. 2006.

FIELD OF THE INVENTION

This invention is related to motion suppression devices that can be attached to floating structures to reduce heave, pitch, and/or roll.

BACKGROUND OF THE INVENTION

Floating structures in a body of water may be subject to wave and/or current induced motions such as heave, pitch, and/or roll. For passenger vessels, such as cruise ships, it is desirable to minimize these motions due to sea-sickness and the comfort of the passengers. For cargo vessels, it is desirable to minimize these motions to protect the cargo. For offshore drilling and/or production vessels it is desirable to minimize these motions due to safety of the crew and connections and fatigue of lines to the vessels, such as drilling pipes, import and export lines, tendons, umbilicals, and others.

For ships, active and passive motion suppression devices, such as gyroscopes, specially designed hulls, tanks, moveable weights, springs, and wings, have been used to suppress motion. Most such devices work when the ship is in motion. It is generally more difficult to suppress the motion of a stationary ship.

U.S. Pat. No. 6,910,438 discloses an oscillation suppression system to inhibit vertical and rotational resonance of a floating platform. The oscillation suppression system includes energy absorption chambers mounted in or about the hull of the floating platform. The chambers may be separately attached or integrated as part of the structure. The chambers are comprised of gas in an upper portion, and water mass in a lower portion. The chambers are closed or partially vented at the upper ends and open at their bottom ends. The enclosed gas in the upper portion of the chamber acts as a gas spring reacting against the floating platform and the water mass. The suppression of resonant oscillations of the floating platform system is accomplished through the gas-spring pressure changes acting on the floating platform system in phase opposition to external forces. U.S. Pat. No. 6,910,438 is herein incorporated by reference in its entirety.

There is a need in the art for improved systems and methods for suppressing motions of floating structures.

There is a need in the art for systems and methods for suppressing motions of floating structures that do not suffer from the disadvantages of the prior art.

There is a need in the art for systems and methods for suppressing motions of floating structures at different excitation frequencies.

There is a need in the art for systems and methods for suppressing motions of floating structures at multiple excitation frequencies.

These and other needs will become apparent to those of skill in the art upon review of this specification, including its drawings and claims.

SUMMARY OF THE INVENTION

In one aspect, the invention provides a system comprising a floating structure, the structure subject to waves and/or water currents; and at least one motion suppression system attached to the floating structure; the motion suppression system comprising a first oscillating water column tuned to a first frequency and a second oscillating water column tuned to a second frequency.

In another aspect, the invention provides a method comprising placing a floating structure in a body of water, the body of water comprising waves and/or water currents; attaching a first oscillating water column tuned to a first frequency to the floating structure, at least a portion of the first oscillating water column in the body of water; and attaching a second oscillating water column tuned to a second frequency to the floating structure, at least a portion of the second oscillating water column in the body of water.

Advantages of the invention may include one or more of the following:

improved systems and methods for suppressing motions of floating structures;

systems and methods for suppressing motions of floating structures that do not suffer from the disadvantages of the prior art;

systems and methods for suppressing motions of floating structures at different excitation frequencies; and/or systems and methods for suppressing motions of floating structures at multiple excitation frequencies.

DETAILED DESCRIPTION

In one embodiment, there is disclosed a system comprising a floating structure, the structure subject to waves and/or water currents; and at least one motion suppression system attached to the floating structure; the motion suppression system comprising a first oscillating water column tuned to a first frequency and a second oscillating water column tuned to a second frequency. In some embodiments, the system also includes a connector attached to the floating structure, and attached to a subsea structure. In some embodiments, the connector is selected from an umbilical, a riser, and a tendon. In some embodiments, the at least one motion suppression system comprises a motion suppression system adapted to suppress heave of the floating structure. In some embodiments, the at least one motion suppression system comprises a motion suppression system adapted to suppress pitch of the floating structure. In some embodiments, the at least one motion suppression system comprises a motion suppression system adapted to suppress roll of the floating structure. In some embodiments, the at least one motion suppression system comprises a first motion suppression system adapted to suppress roll of the floating structure, a second motion suppression system adapted to suppress pitch of the floating structure, and a third motion suppression system adapted to suppress heave of the floating structure. In some embodiments, the first frequency and the second frequency are from 2 to 30 cycles per minute. In some embodiments, the first frequency and the second frequency are from 3 to 20 cycles per minute. In some embodiments, the first frequency and the second frequency are from 5 to 15 cycles per minute.

In one embodiment, there is disclosed a method comprising placing a floating structure in a body of water, the body of water comprising waves and/or water currents; attaching a first oscillating water column tuned to a first frequency to the floating structure, at least a portion of the first oscillating water column in the body of water; and attaching a second oscillating water column tuned to a second frequency to the floating structure, at least a portion of the second oscillating water column in the body of water. In some embodiments, the method also includes attaching a connector to the floating structure, and attaching a connector to a subsea structure. In some embodiments, the first frequency and the second frequency are from 2 to 30 cycles per minute. In some embodiments, the first frequency and the second frequency are from 3 to 20 cycles per minute. In some embodiments, the first frequency and the second frequency are from 5 to 15 cycles per minute.

Figure 1:
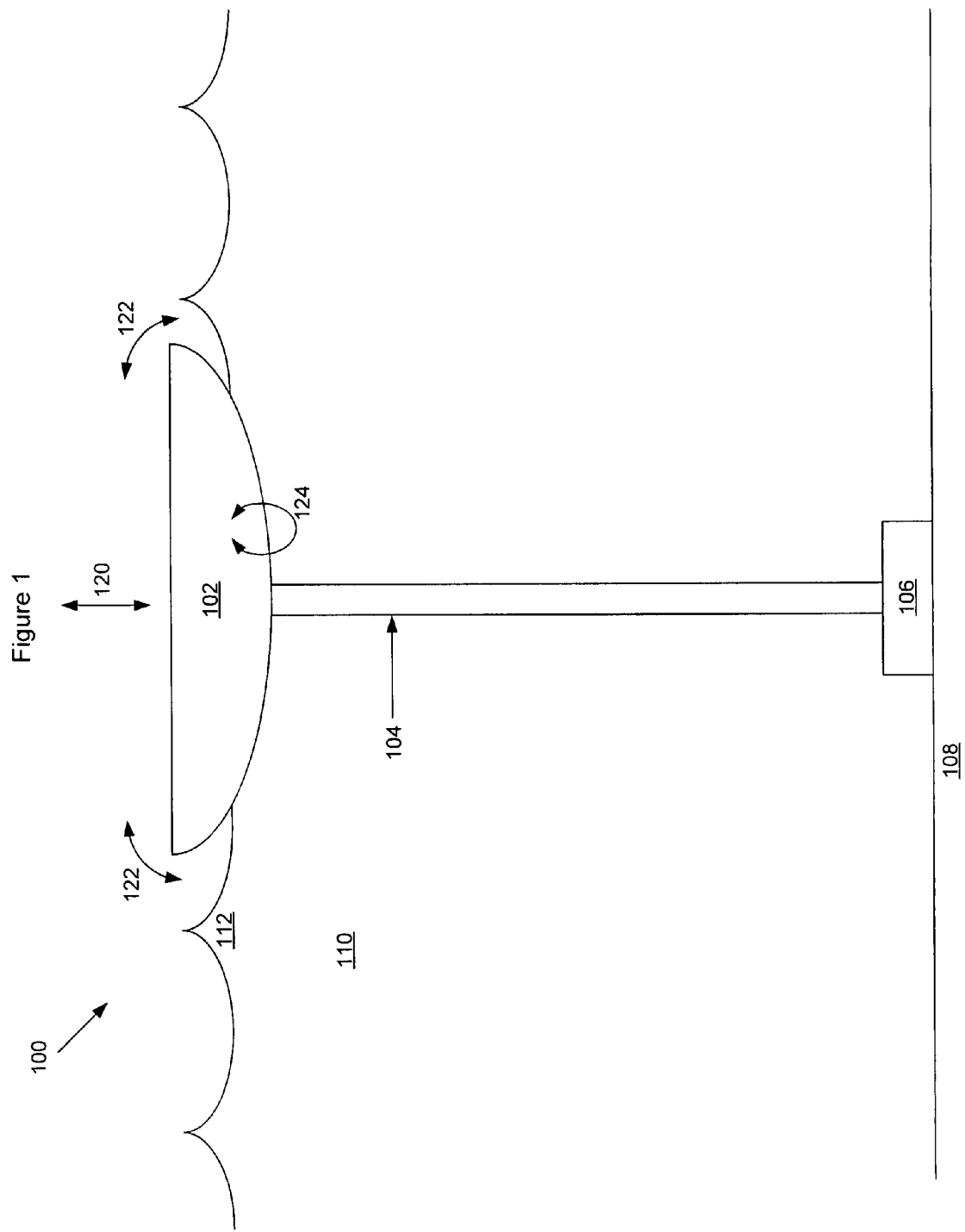
FIG. 1 illustrates a side view of a floating structure in a body of water.

Referring now to FIG. 1 there is illustrated offshore system 100. System 100 includes floating structure 102 floating in body of water 110 near the water surface, which is attached to connector 104, which connector 104 is attached to subsurface structure 106, which is adjacent to seafloor 108.

Waves and/or currents 112 in water 110 may cause heave 120, pitch 122, and/or roll 124 of floating structure 102.

Figure 2:
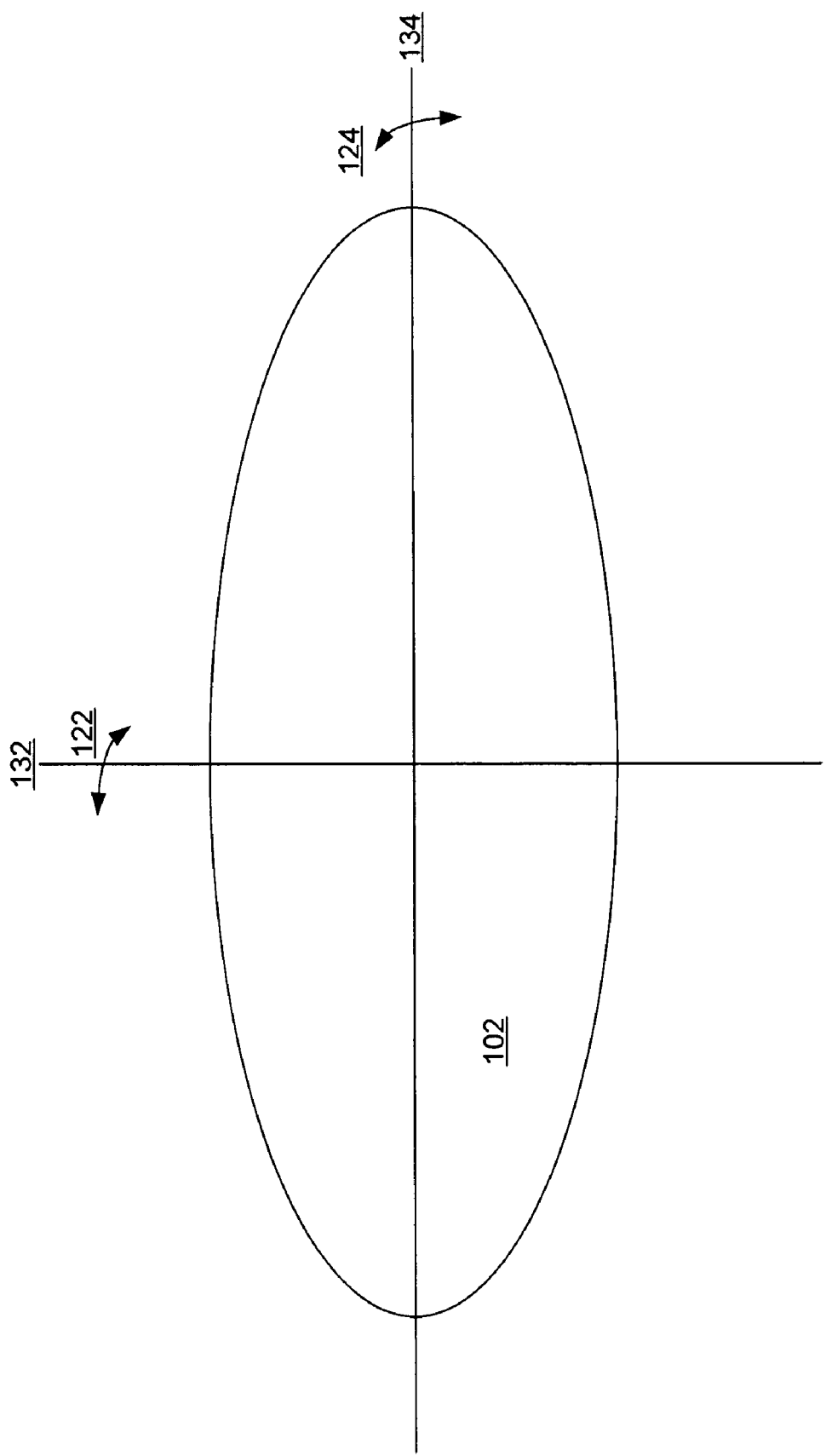
FIG. 2 illustrates a top view of a floating structure in a body of water.

Referring now to FIG. 2, a top view of floating structure 102 is shown. Pitch 122 is defined as rotational motion about axis 132. Roll 124 is defined as rotational motion about axis 134.

In some embodiments, floating structure 102 may be a floating offshore platform, a tension leg platform, a semisubmersible platform, a drilling vessel, a production vessel, a FPSO, a ship, or a boat, or other types of floating structures as are known in the art. In some embodiments, connector 104 may be a rope, a cable, a mooring line, a riser, an import line, an export line, a drill pipe, or an umbilical, or other types of connectors as are known in the art. In some embodiments, subsurface structure 106 may be an anchor, a wellhead, a subsurface flowline, a Christmas tree, a pump, a separator, or other types of subsurface structures as are known in the art.

Figure 3:
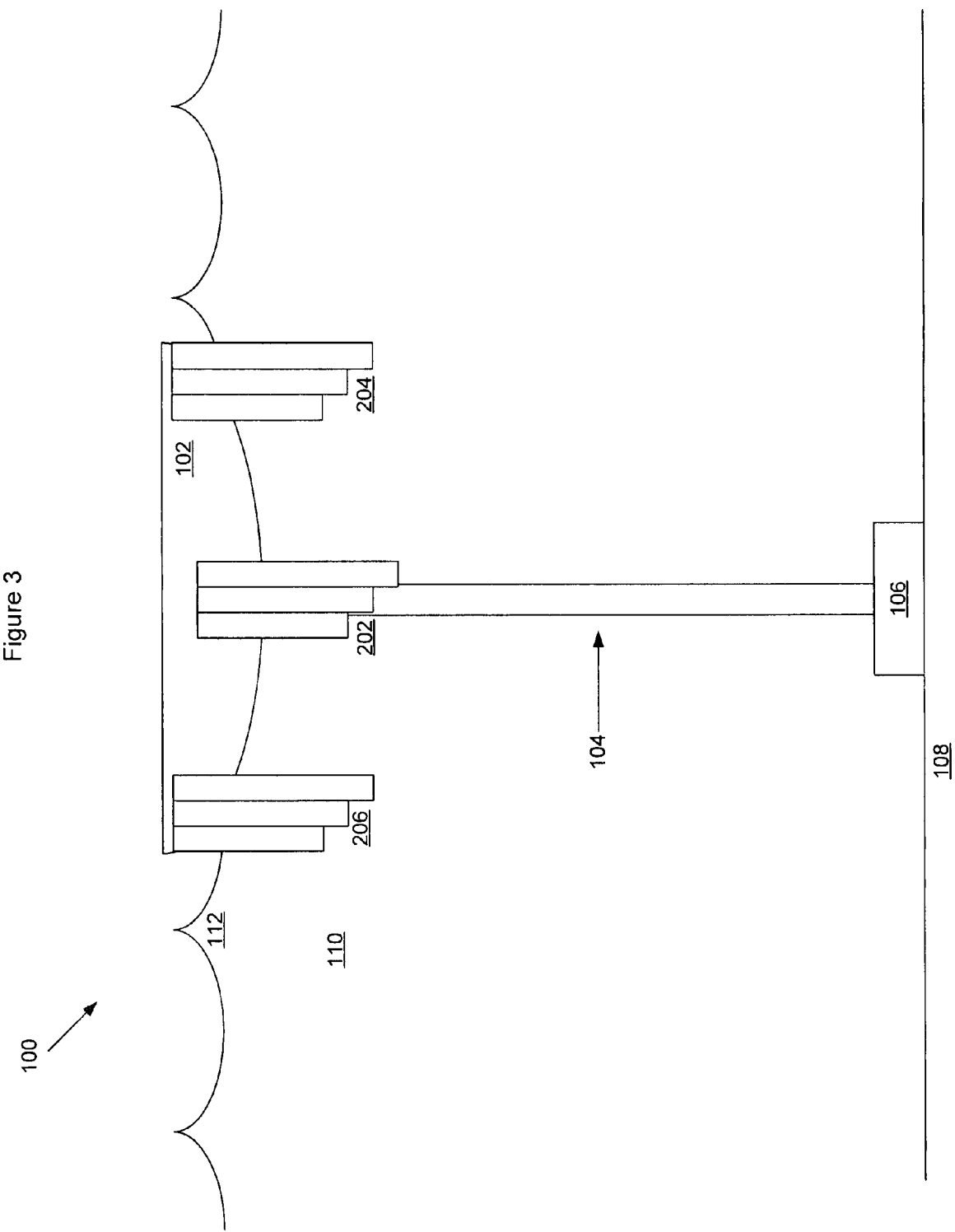
FIG. 3 illustrates a side view of a floating structure in a body of water with motion suppression systems.

Referring now to FIG. 3, there is illustrated offshore system 100. System 100 includes floating structure 102 floating in body of water 110 near the water surface, which is attached to connector 104, which connector 104 is attached to subsurface structure 106, which is adjacent to seafloor 108.

Motion suppression system 202 has been attached to floating structure 102 to suppress heave and/or roll. Motion suppression system 204 has been attached to floating structure 102 to suppress heave and/or pitch. Motion suppression system 206 has been attached to floating structure 102 to suppress heave and/or pitch.

In some embodiments, motion suppression system 202 includes 2 or more oscillating water column structures, for example from about 2 to about 10, or from about 3 to about 5. Each oscillating water column structure may be tuned to dampen a frequency or frequency range. In some embodiments, suitable frequency ranges include from about 2 to about 30 cycles per minute, for example from about 3 to about 20 cycles per minute, or from about 5 to about 15 cycles per minute, or about 12 cycles per minute. In some embodiments, for a motion suppression system with 3 oscillating water column structures, a first oscillating water column structure may have a frequency of about 2 cycles per minute, a second oscillating water column structure may have a frequency of about 12 cycles per minute, and a third oscillating water column structure may have a frequency of about 30 cycles per minute.

Figure 4:
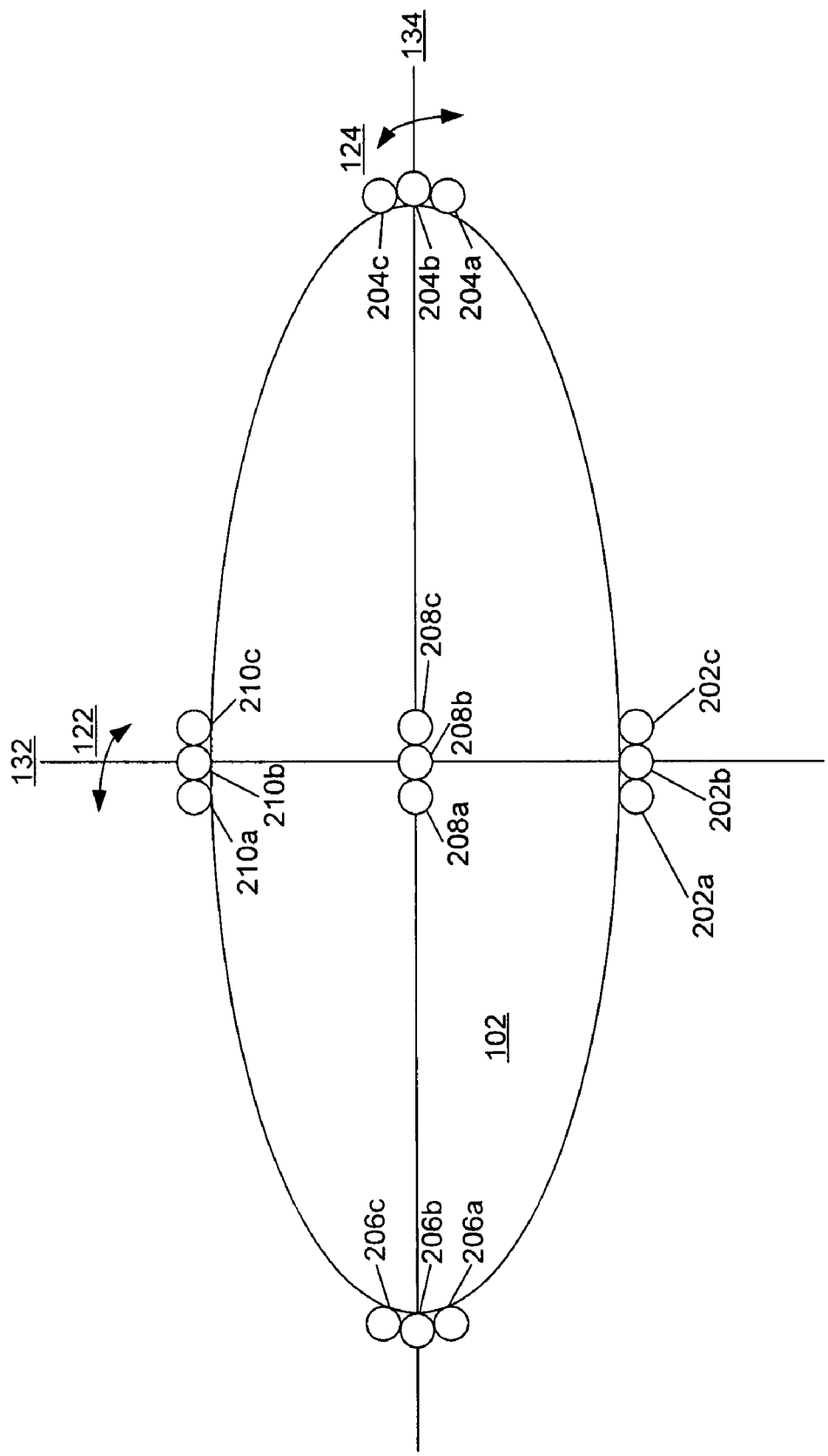
FIG. 4 illustrates a top view of a floating structure in a body of water with motion suppression systems.

Referring now to FIG. 4, there is illustrated floating structure 102. Oscillating water column structure 202a, oscillating water column structure 202b, and oscillating water column structure 202c have been attached to floating structure 102 to suppress heave and/or roll. Oscillating water column structure 204a, oscillating water column structure 204b, and oscillating water column structure 204c have been attached to floating structure 102 to suppress heave and/or pitch. Oscillating water column structure 206a, oscillating water column structure 206b, and oscillating water column structure 206c have been attached to floating structure 102 to suppress heave and/or pitch. Oscillating water column structure 208a, oscillating water column structure 208b, and oscillating water column structure 208c have been attached to floating structure 102 to suppress heave. Oscillating water column structure 210a, oscillating water column structure 210b, and oscillating water column structure 210c have been attached to floating structure 102 to suppress heave and/or roll.

Figure 5:
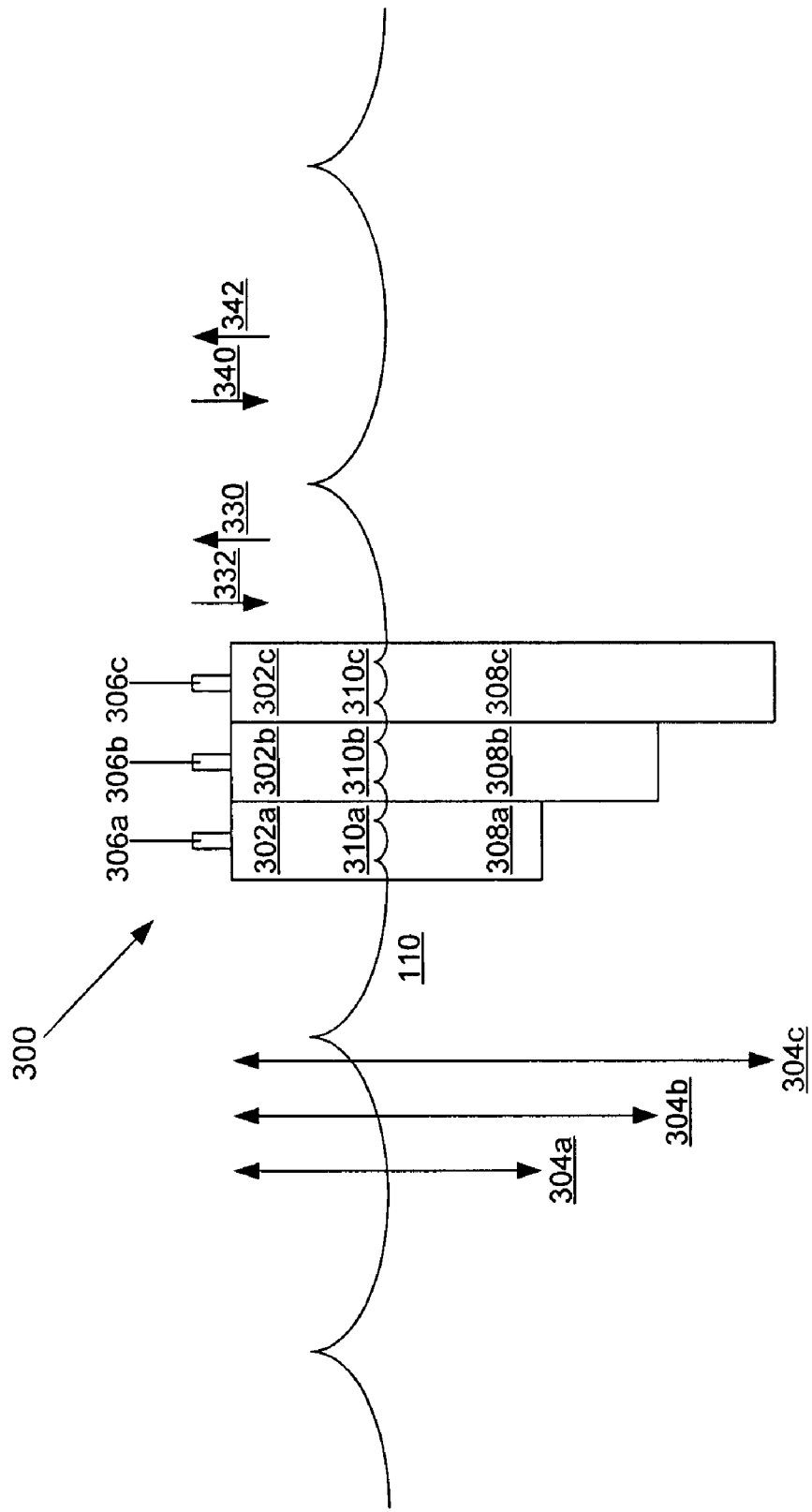
FIG. 5 illustrates a side view of a motion suppression system.

Referring now to FIG. 5, there is illustrated motion suppression system 300 in water 110, which includes oscillating water column structure 302a, oscillating water column structure 302b, and oscillating water column structure 302c. Oscillating water column structure 302a has height 304a, vent 306a, water portion 308a, and air portion 310a. Oscillating water column structure 302b has height 304b, vent 306b, water portion 308b, and air portion 310b. Oscillating water column structure 302c has height 304c, vent 306c, water portion 308c, and air portion 310c.

In general, the greater the height of oscillating water column structure, the lower the frequency it is tuned to. Similarly, the smaller the opening in the vent, the lower the frequency it is tuned to. The height and/or vent opening can be modified as desired to achieve the desired frequency response from the oscillating water column structure.

In some embodiments, vents 306a, 306b, and 306c are all about the same size, and oscillating water column structure 302a has the highest frequency due to its short length 304a, oscillating water column structure 302c has the lowest frequency due to its long length 304c, and oscillating water column structure 302b is in between.

When upwards force 330 is applied to motion suppression system 300, water portions 308a, 308b, and 308c are lifted out of water 110, and exert a counteracting restoring force 332 due to gravity. If motion suppression system 300 is kept out of water, air flows into vents 306a, 306b, and 306c and water flows out the bottom of oscillating water column structures 302a, 302b, and 302c, so that water levels in the oscillating water column structures eventually match the water level of water 110. The speed of this restoration may be adjusted by the sizes of the vents and/or the lengths of the columns.

When downwards force 340 is applied to motion suppression system 300, air portions 310a, 310b, and 310c are pushed into water 110, and exert a counteracting restoring force 342 due to buoyancy. If motion suppression system 300 is kept under water, air flows out of vents 306a, 306b, and 306c and water flows into the bottom of oscillating water column structures 302a, 302b, and 302c, so that water levels in the oscillating water column structures eventually match the water level of water 110. The speed of this restoration may be adjusted by the sizes of the vents and/or the lengths of the columns.

Figure 6:
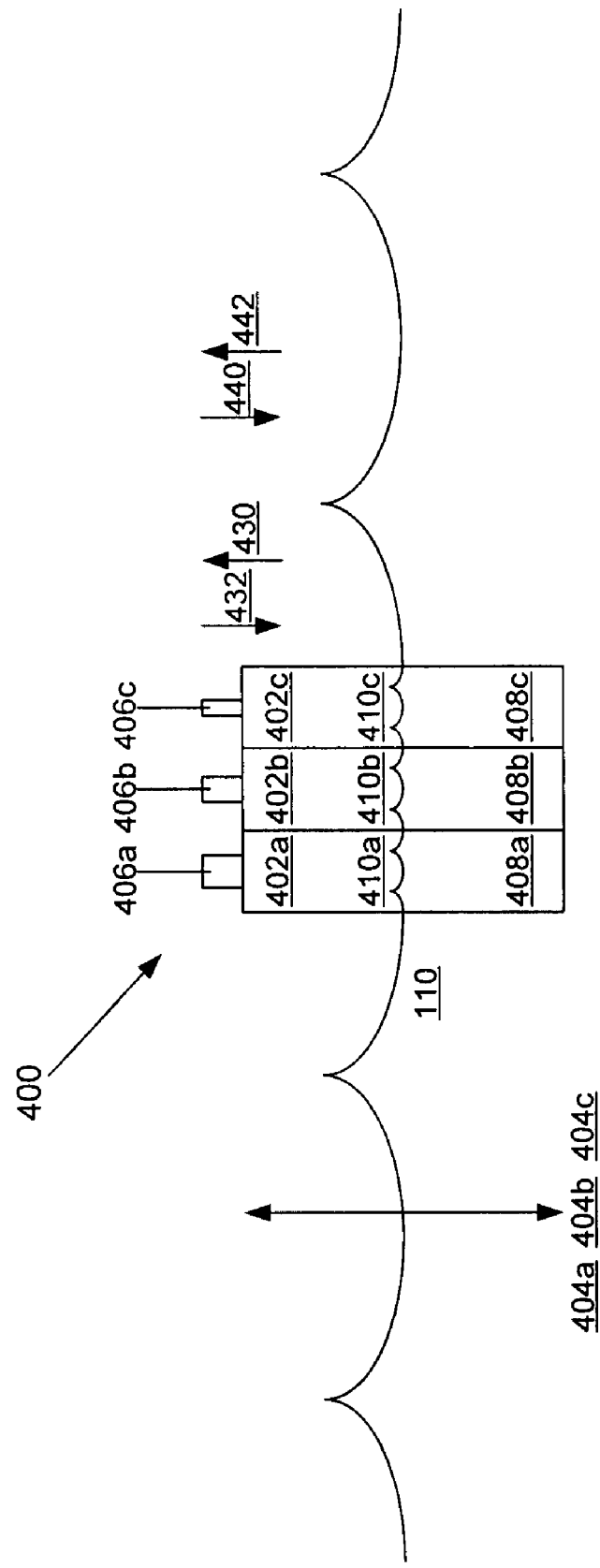
FIG. 6 illustrates a side view of a motion suppression system.

Referring now to FIG. 6, there is illustrated motion suppression system 400 in water 110, which includes oscillating water column structure 402a, oscillating water column structure 402b, and oscillating water column structure 402c. Oscillating water column structure 402a has height 404a, vent 406a, water portion 408a, and air portion 410a. Oscillating water column structure 402b has height 404b, vent 406b, water portion 408b, and air portion 410b. Oscillating water column structure 402c has height 404c, vent 406c, water portion 408c, and air portion 410c.

In general, the greater the height of oscillating water column structure, the lower the frequency it is tuned to. Similarly, the smaller the opening in the vent, the lower the frequency it is tuned to. The height and/or vent opening can be modified as desired to achieve the desired frequency response from the oscillating water column structure.

In some embodiments, heights 404a, 404b, and 404c are all about the same, and oscillating water column structure 402a has the highest frequency due to its large vent 406a, oscillating water column structure 402c has the lowest frequency due to its small vent 406c, and oscillating water column structure 402b is in between.

When upwards force 430 is applied to motion suppression system 400, water portions 408a, 408b, and 408c are lifted out of water 110, and exert a counteracting restoring force 432 due to gravity. If motion suppression system 400 is kept out of water, air flows into vents 406a, 406b, and 406c and water flows out the bottom of oscillating water column structures 402a, 402b, and 402c, so that water levels in the oscillating water column structures eventually match the water level of water 110. The speed of this restoration may be adjusted by the sizes of the vents and/or the lengths of the columns.

When downwards force 440 is applied to motion suppression system 400, air portions 410a, 410b, and 410c are pushed into water 110, and exert a counteracting restoring force 442 due to buoyancy. If motion suppression system 400 is kept under water, air flows out of vents 406a, 406b, and 406c and water flows into the bottom of oscillating water column structures 402a, 402b, and 402c, so that water levels in the oscillating water column structures eventually match the water level of water 110. The speed of this restoration may be adjusted by the sizes of the vents and/or the lengths of the columns.

In some embodiments, oscillating water columns may be open to the water at the bottom, and closed to the air at the top, with a small vent provided at the top for air to flow in and out. In some embodiments, oscillating water columns may be closed to the water at the bottom, and open to the air at the top, with a small vent provided at the bottom for water to flow in and out. In some embodiments, oscillating water columns may be open to the water at the bottom, and open to the air at the top, with a limited size opening provided in the middle for water and/or air to flow in and out, such as a screen, a grate, or a reduced diameter portion.

Figure 7:
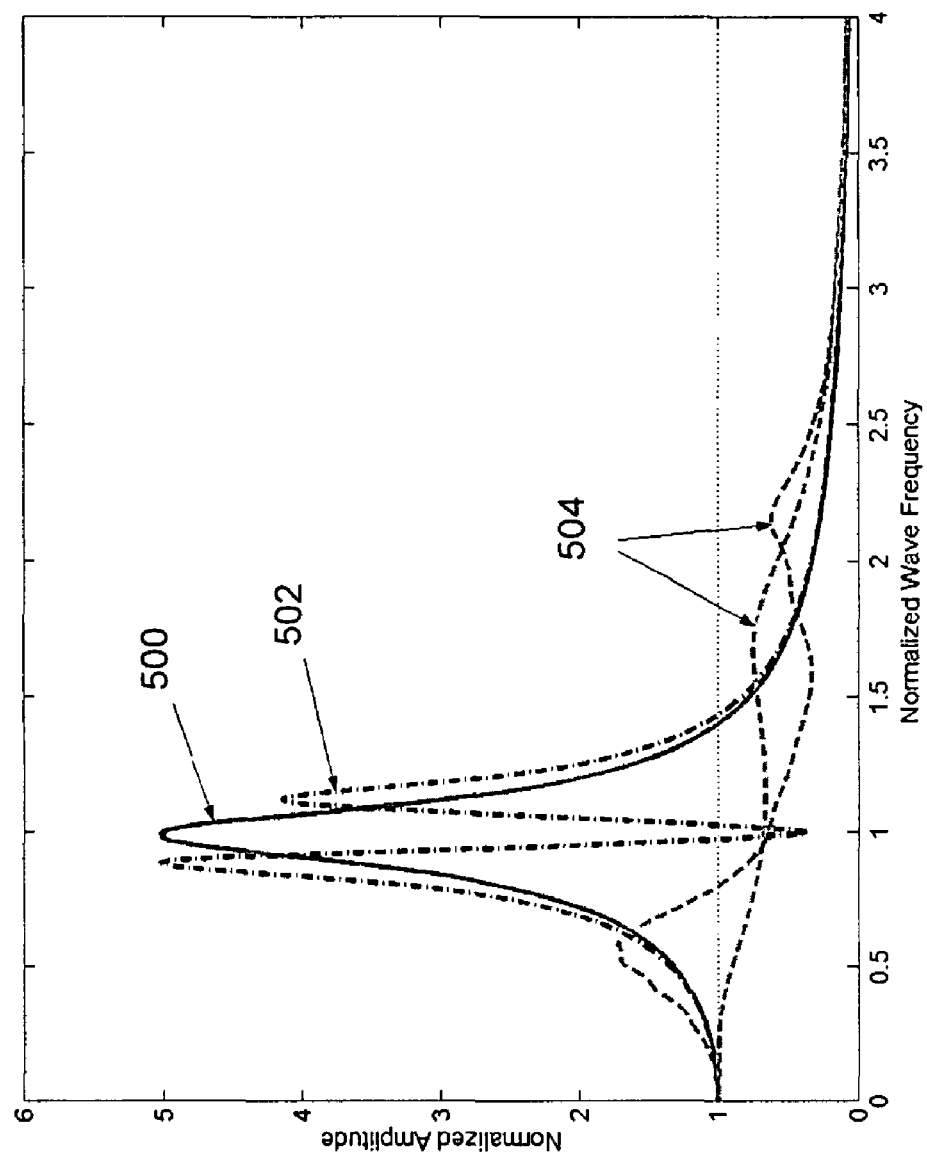
FIG. 7 illustrates the response of a system with and without motion suppression systems.

Referring now to FIG. 7, there is illustrated a response graph of a floating system to normalized frequencies of wave with and without motion suppression systems attached to the floating system. As used herein, the term normalized frequency means the frequency ratio of excitation frequency to the natural frequency of a floating structure. Line 500 indicates the worst response, which corresponds to the floating system without any motion suppression systems attached. Line 502 indicates the second worst response, which corresponds to the floating system with a motion suppression system attached, which has a single oscillating water column. Lines 504 indicate the best responses, which correspond to the floating system with a motion suppression system attached, which has multiple oscillating water columns tuned to different frequencies.

In some embodiments, governing equations of motion for a floating structure with a suppression system are set forth below as Equations 1a and 1b:

$$M\frac{d^2 X}{dt^2} + C\frac{dX}{dt} + KX + f_1(X, x_i) + g_1(X, x_i) = F_1 \quad (1a)$$

$$m_i\frac{d^2 x_i}{dt^2} + c_i\frac{dx_i}{dt} + k_i x_i + f_2(X, x_i) + g_2(X, x_i) = F_2 \quad (1b)$$

$$i = 1, 2 \ldots n$$

where M=mass of floating structure including added mass
C=damping coefficient of floating structure
K=stiffness of floating structure
X=response of floating structure in heave, pitch, and/or roll
$m_i$=inertia of water within oscillating water column
$c_i$=damping coefficient of oscillating water column
$k_i$=stiffness of oscillating water column
$x_i$=response of water within water column
$f_1$ and $f_2$=coupling terms between floating structure and oscillating water columns as functions of the floating structure response and oscillating water responses within water column
$g_1$ and $g_2$=nonlinear terms
$F_1$ and $F_2$=excitation forces due to environmental loadings Equation (1a) represents the floating structure motions in heave, pitch, or/and roll. Equation (1b) describes the oscillating water column responses. Subscript 'i' represents the differently tuned oscillating water columns.

In some embodiments, systems and/or methods to tune a suppression system may be achieved by using oscillating water column structures with different lengths so that each oscillating water column structures has different natural frequencies (differently tuned). The air trapped inside a oscillating water column structure may work as a spring, and the water may work as a mass. Some oscillating water column structures may have a closed top (without vent) and open bottom. By adjusting the height of water column as well as air height, each oscillating water column structure can be tuned differently for different excitation frequencies. The natural frequency of the oscillating water column is the function of both water height and air height (or amount of air trapped). For example, without floating structure motion, the natural frequency $f_n$ of oscillating water column can be found from the equation (1c) as follows (for uniform pipe diameter):

$$f_n = \frac{1}{2\pi}\sqrt{\frac{\left(g + \frac{P_1\gamma}{\rho Z}\right)}{H}} \quad (1c)$$

where Z is air height and H is water height within pipe.

In some embodiments, to tune the suppression system for different frequencies, either water height and/or air height can be adjusted.

In some embodiments, damping of oscillating water column structures may be achieved by having a cross-sectional change within the column, for example a reduced diameter portion. This may cause vortex shedding at the cross-sectional change within the water column. As water moves up and down, vortices may form and dissipate energy.

In some embodiments, damping of oscillating water column structures may be achieved by using screens or baffle to control the water flow. By using different size screen meshes, different amount of damping can be achieved.

In some embodiments, damping of oscillating water column structures may be achieved by having an opening near the top of the column, which uses a time delay due to air venting as water moves up and down. This can be used to tune the suppression system with different vent sizes.

Those of skill in the art will appreciate that many modifications and variations are possible in terms of the disclosed embodiments, configurations, materials and methods without departing from their spirit and scope. Accordingly, the scope of the claims appended hereafter and their functional equivalents should not be limited by particular embodiments described and illustrated herein, as these are merely exemplary in nature.

That which is claimed is:

1. A system comprising:
   a floating structure, the structure subject to waves and/or water currents; and
   at least one motion suppression system attached to the floating structure;
   the motion suppression system comprising a first oscillating water column tuned to a first frequency of about 2 cycles per minute, a second oscillating water column tuned to a second frequency of about 12 cycles per minute, and a third oscillating water column tuned to a third frequency of about 30 cycles per minute.

2. The system of claim 1, further comprising a connector attached to the floating structure, and attached to a subsea structure.

3. The system of claim 2, wherein the connector is selected from an umbilical, a riser, and a tendon.

4. The system of claim 1, wherein the at least one motion suppression system comprises a motion suppression system adapted to suppress heave of the floating structure.

5. The system of claim 1, wherein the at least one motion suppression system comprises a motion suppression system adapted to suppress pitch of the floating structure.

6. The system of claim 1, wherein the at least one motion suppression system comprises a motion suppression system adapted to suppress roll of the floating structure.

7. The system of claim 1, wherein the first oscillating water column is adapted to suppress roll of the floating structure, the second oscillating water column is adapted to suppress pitch of the floating structure, and the third oscillating water column is adapted to suppress heave of the floating structure.

8. A method comprising:
   placing a floating structure in a body of water, the body of water comprising waves and/or water currents;
   attaching a first oscillating water column tuned to a first frequency of about 2 cycles per minute to the floating structure, at least a portion of the first oscillating water column extending in the body of water;
   attaching a second oscillating water column tuned to a second frequency of about 12 cycles per minute to the floating structure, at least a portion of the second oscillating water column extending in the body of water; and
   attaching a third oscillating water column tuned to a third frequency of about 30 cycles per minute to the floating structure, at least a portion of the third oscillating water column extending in the body of water.

9. The method of claim 8, further comprising attaching a connector to the floating structure, and attaching a connector to a subsea structure.

\* \* \* \* \*